US012292290B2

(12) United States Patent
Hedges et al.

(10) Patent No.: US 12,292,290 B2
(45) Date of Patent: May 6, 2025

(54) VEHICLE LOCALIZATION BASED ON POSE CORRECTIONS FROM REMOTE VEHICLES IN PARKING GARAGES

(71) Applicant: Aptiv Technologies AG, Schaffhausen (CH)

(72) Inventors: Christopher A. Hedges, Greentown, IN (US); Jeremy S. Greene, Indianapolis, IN (US)

(73) Assignee: Aptiv Technologies AG, Schaffhausen (CH)

( * ) Notice: Subject to any disclaimer, the term of this patent is extended or adjusted under 35 U.S.C. 154(b) by 321 days.

(21) Appl. No.: 17/818,466

(22) Filed: Aug. 9, 2022

(65) Prior Publication Data

US 2024/0053154 A1 Feb. 15, 2024

(51) Int. Cl.
*G01C 21/28* (2006.01)
*B60L 53/66* (2019.01)
(Continued)

(52) U.S. Cl.
CPC ........... *G01C 21/28* (2013.01); *B60W 60/001* (2020.02); *G06Q 30/0207* (2013.01);
(Continued)

(58) Field of Classification Search
CPC ...... G01C 21/28; G01C 21/206; G01C 23/00; B60W 60/001; B60W 2420/403;
(Continued)

(56) References Cited

U.S. PATENT DOCUMENTS

2019/0266748 A1* 8/2019 Ahmad ................ G05D 1/0246
2020/0110183 A1* 4/2020 Won ..................... G08G 1/0965
(Continued)

FOREIGN PATENT DOCUMENTS

CN 112810603 A 5/2021

OTHER PUBLICATIONS

Cherian, J. (2019). Mobile crowdsensing applications for intelligent parking and mobility. Doctoral thesis, Nanyang Technological University, Singapore. (Year: 2019).*
(Continued)

*Primary Examiner* — Thomas Ingram
(74) *Attorney, Agent, or Firm* — Harness, Dickey & Pierce, P.L.C.

(57) ABSTRACT

This document describes techniques and systems for vehicle localization based on pose corrections from remote vehicles in parking garages and other GNSS denial environments. A system can include a processor and computer-readable storage media comprising instructions that, when executed by the processor, cause the system to autonomously operate a host vehicle and determine an estimated pose of the host vehicle within the GNSS denial environment. The instructions also cause the processor to transmit a pose request to a remote vehicle in the GNSS denial environment. In response to the pose request, the system can receive a corrected pose of the host vehicle from the remote vehicle. The instructions further cause the processor to use the corrected pose to determine an updated pose for the host vehicle. In this way, the system can provide highly accurate vehicle localization in GNSS denial environments in a cost-effective manner.

22 Claims, 6 Drawing Sheets

(51) Int. Cl.
  *B60W 60/00*  (2020.01)
  *G06Q 30/0207*  (2023.01)
(52) U.S. Cl.
  CPC ...... *B60L 53/665* (2019.02); *B60W 2420/403* (2013.01); *B60W 2420/408* (2024.01); *B60W 2420/54* (2013.01); *B60W 2520/04* (2013.01); *B60W 2556/45* (2020.02)
(58) Field of Classification Search
  CPC ....... B60W 2420/408; B60W 2420/54; B60W 2520/04; B60W 2556/45; B60W 50/00; B60W 2556/65; G06Q 30/0207; B60L 53/665; G01S 5/0247; G01S 2205/01; H04W 4/023; H04W 4/025; H04W 4/46
  See application file for complete search history.

(56) References Cited

U.S. PATENT DOCUMENTS

2021/0331666 A1* 10/2021 Meng ..................... G08G 1/146
2022/0032970 A1*  2/2022 Vadivelu ................ G06N 3/045
2023/0367013 A1* 11/2023 Qi ........................... G01S 17/86

OTHER PUBLICATIONS

Extended European Search Report regarding Application No. 23163660.6, dated Jan. 19, 2024.
Li Yanhao et al: "A Collaborative 1-15 Relative Localization Method for Vehicles using Vision and LiDAR Sensors", 2020 16th International Conference on Control, Automation, Robotics and Vision (ICARCV), IEEE, Dec. 13, 2020 (Dec. 13, 2020), pp. 281-286, XP033873940, DOI: 10.1109/ICARCV50220.2020.9305453.

* cited by examiner

VEHICLE LOCALIZATION BASED ON POSE CORRECTIONS FROM REMOTE VEHICLES IN PARKING GARAGES

BACKGROUND

Vehicle localization is a technique of using sensor data to localize a vehicle to a map (e.g., determining the location of the vehicle on the map). Vehicle localization may be used to support autonomous vehicle operations (e.g., navigation, path planning, lane determination and centering, and curve execution without lane markers). Some autonomous vehicles perform driving operations, which depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage.

SUMMARY

This document describes techniques and systems for vehicle localization based on pose corrections from remote vehicles in parking garages and other GNSS denial environments. In some examples, a system includes at least one processor and at least one computer-readable storage medium comprising instructions that, when executed by the processor, cause the system to autonomously operate a host vehicle in a GNSS denial environment and determine an estimated pose of the host vehicle within the GNSS denial environment. The instructions also cause the processor to transmit a pose request to a remote vehicle in the GNSS denial environment. In response to the pose request, the system can receive a corrected pose of the host vehicle from the remote vehicle. The instructions further cause the processor to use the corrected pose to determine an updated pose for the host vehicle. In this way, the system can provide highly accurate vehicle localization in GNSS denial environments in a cost-effective manner.

This document also describes methods performed by the above-summarized system and other configurations of the system set forth herein and means for performing these methods.

This Summary introduces simplified concepts related to vehicle localization based on pose corrections from remote vehicles in parking garages, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques enabling vehicle localization based on pose corrections from remote vehicles in parking garages are described with reference to the following drawings. The same numbers are used throughout the drawings to reference like features and components.

DETAILED DESCRIPTION

Overview

As described above, vehicle localization can support autonomous vehicle operations (e.g., navigation, path planning, lane determination and centering, and curve execution without lane markers). Autonomous vehicle operations can depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage, and thus autonomous vehicle operations may not be available in such environments.

For GNSS denial environments, some systems may use Simultaneous Localization and Mapping (SLAM) techniques that map out features as a vehicle traverses through an unknown environment. These SLAM systems can then use the mapped-out features to localize the vehicle. Such systems generally rely on vision, LiDAR, or radar systems and complex feature-extraction algorithms to localize the host vehicle to environment features (e.g., parking garage walls).

Other systems may use an absolute map for the GNSS denial environment. The absolute map anchors the environment to a global coordinate system and allows the host vehicle to smoothly handle a transition between open skies and indoor environments. Such systems, however, rely on an expensive inertial measurement unit (IMU) system that uses vehicle odometry to maintain the vehicle positioning inside the GNSS denial environment.

This document describes methods and systems for vehicle localization based on pose corrections from remote vehicles in parking garages and other GNSS denial environments. The host vehicle can initially determine an estimated pose of the host vehicle within the parking garage. The host vehicle can then send a pose request to a remote vehicle located in the parking garage. The remote vehicle can, for example, be parked at an electric-vehicle charging station within the parking garage. In response to sending the pose request, the host vehicle can receive a corrected pose of the host vehicle from the remote vehicle and determine an updated pose. In this way, a highly accurate vehicle pose may be obtained in a cost-effective manner without expensive onboard sensors or reliance on infrastructure-based sensors.

Example Environment

Figure 1:
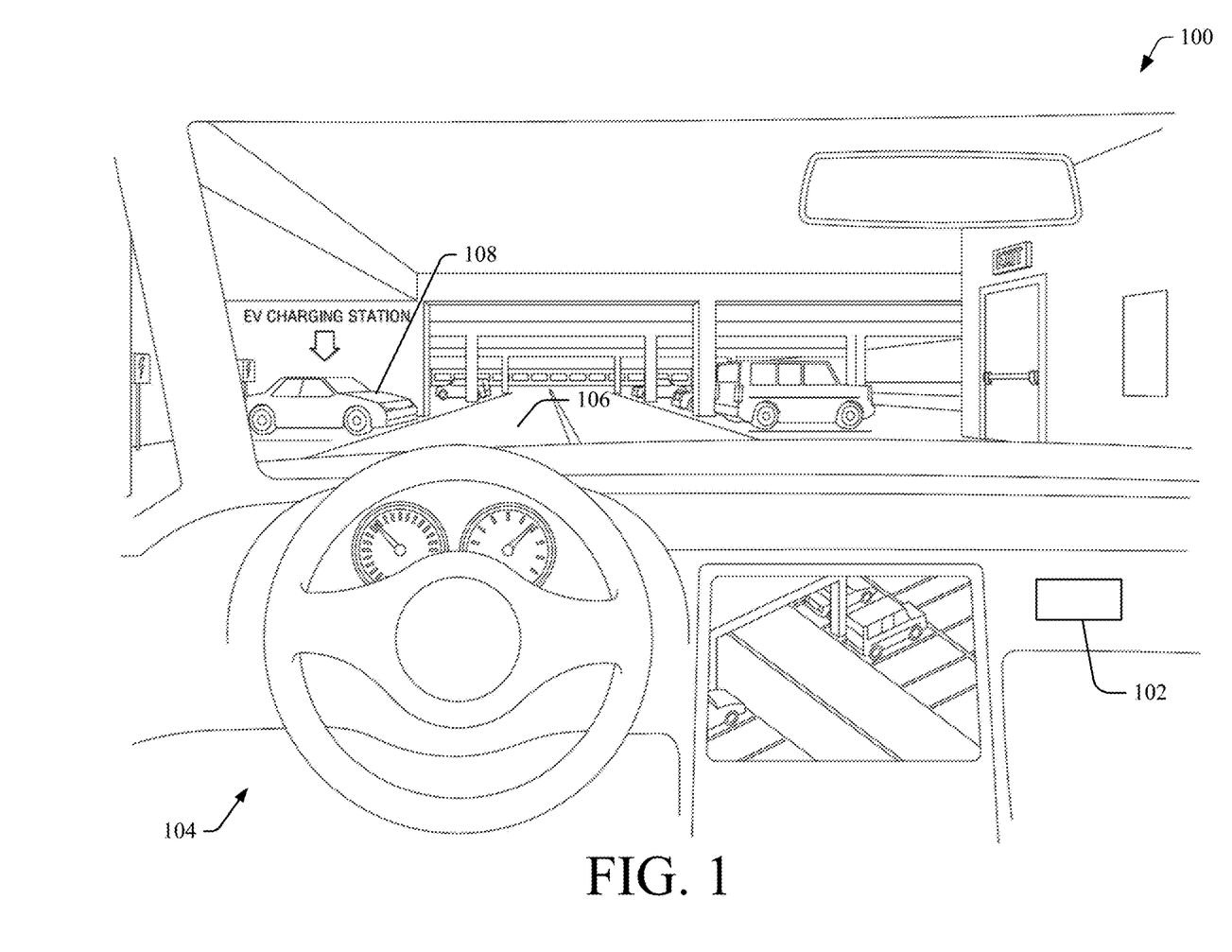
FIG. 1 is an example illustration of an environment in which vehicle localization based on pose corrections from remote vehicles in parking garages may be implemented, in accordance with techniques of this disclosure.

FIG. 1 is an example illustration of an environment 100 in which vehicle localization based on pose corrections from remote vehicles in parking garages may be implemented. In particular, a host vehicle 104 may navigate the environment 100 using pose corrections from a remote vehicle 108. In the example environment 100, a system 102 is located in the host vehicle 104. The host vehicle 104 is autonomously traveling along a roadway 106 in a parking garage or other GNSS denial environment. In the depicted implementation, the remote vehicle 108 is parked at an electric-vehicle charging station. In other implementations, the remote vehicle 108 can be parked at another location in the environment 100.

The system 102 can use one or more sensors (not shown) of the host vehicle 104 to determine an estimated pose (or location) of the host vehicle 104 within the environment 100. As described in greater detail below, the one or more sensors do not include a GNSS or GPS system because the environment 100 is a GNSS denial environment. The system 102 utilizes one or more communication systems (not shown) to send a pose request to the remote vehicle 108. The system 102 can also send the estimated pose to the remote vehicle 108. In response to the pose request, the system 102 can receive a corrected pose of the host vehicle 104 from the remote vehicle 108. The system 102 can then use the corrected pose to determine an updated pose of the host vehicle 104. In this way, a highly accurate vehicle pose may be obtained in a cost-effective manner without expensive onboard sensors or reliance on infrastructure-based sensors within the environment 100.

The updated pose may be used by the system 102 to autonomously navigate the environment 100 based on a reference map generated by the system 102 or a remote system (not shown) for the environment 100. The updated pose may further be used in conjunction with an existing reference map to localize the host vehicle 104.

Figure 2:
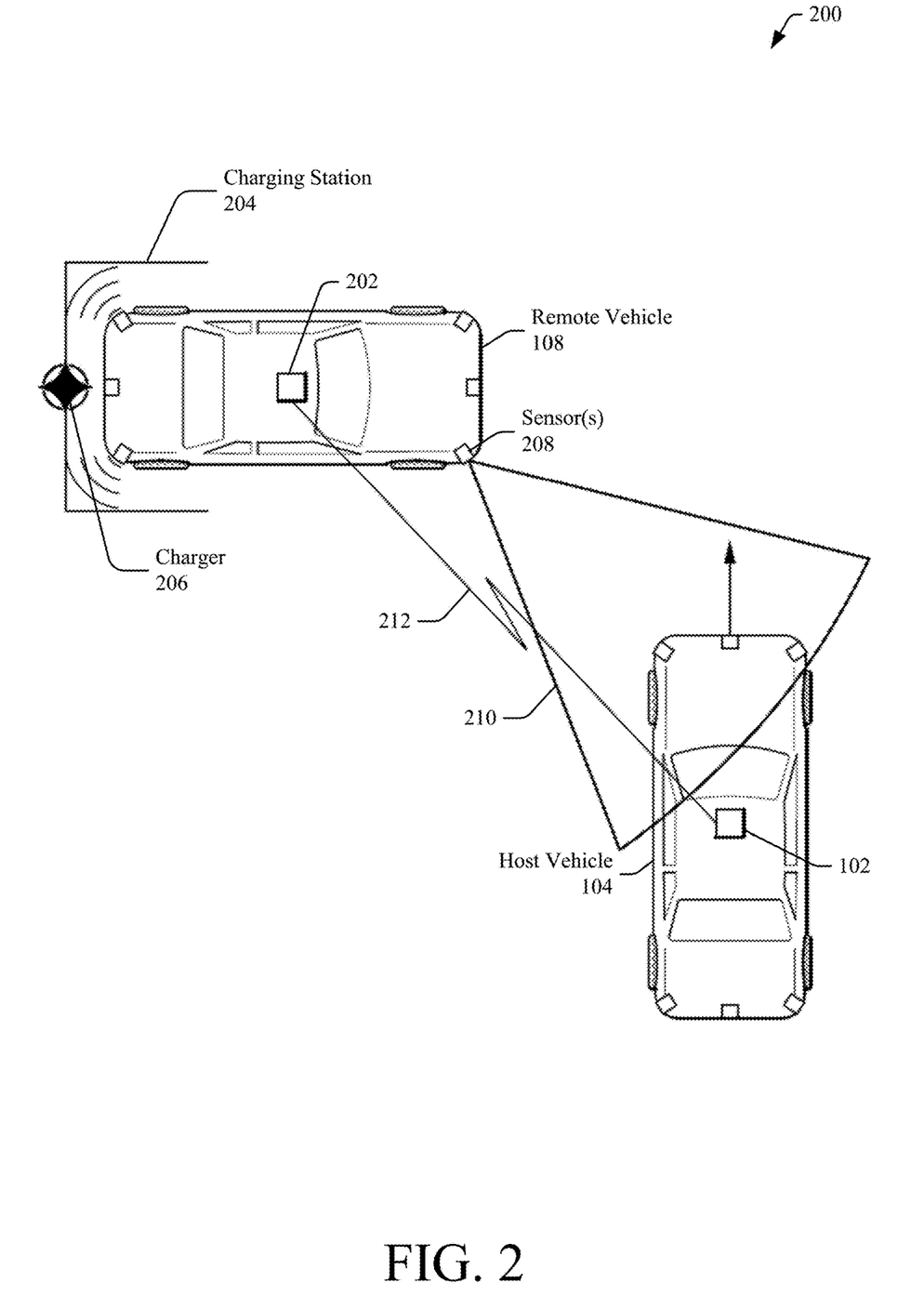
FIG. 2 is an example illustration of another environment in which vehicle localization based on pose corrections from remote vehicles in parking garages may be implemented, in accordance with techniques of this disclosure.

FIG. 2 is an example illustration of another environment 200 in which vehicle localization based on pose corrections from remote vehicles in parking garages may be implemented. In particular, the host vehicle 104 may navigate the environment 200 using pose corrections from the remote vehicle 108. In the example environment 200, the host vehicle 104 uses the system 102, which is described in greater detail with respect to FIGS. 3-5, to localize itself within the environment 200. The remote vehicle 108 includes a remote system 202, which is described in greater detail with respect to FIGS. 3 and 6, to provide pose corrections to the host vehicle 104.

The host vehicle 104 uses the system 102 (or another system) to autonomously operate the host vehicle 104 in the environment 200. The system 102 is also used to determine an estimated pose of the host vehicle 104 within the environment 200. For example, the estimated pose can be determined based on sensor data providing the distance traveled and heading of the host vehicle 104 upon loss of the GNSS signal or from another location known in a world or map coordinate system.

Figure 3:
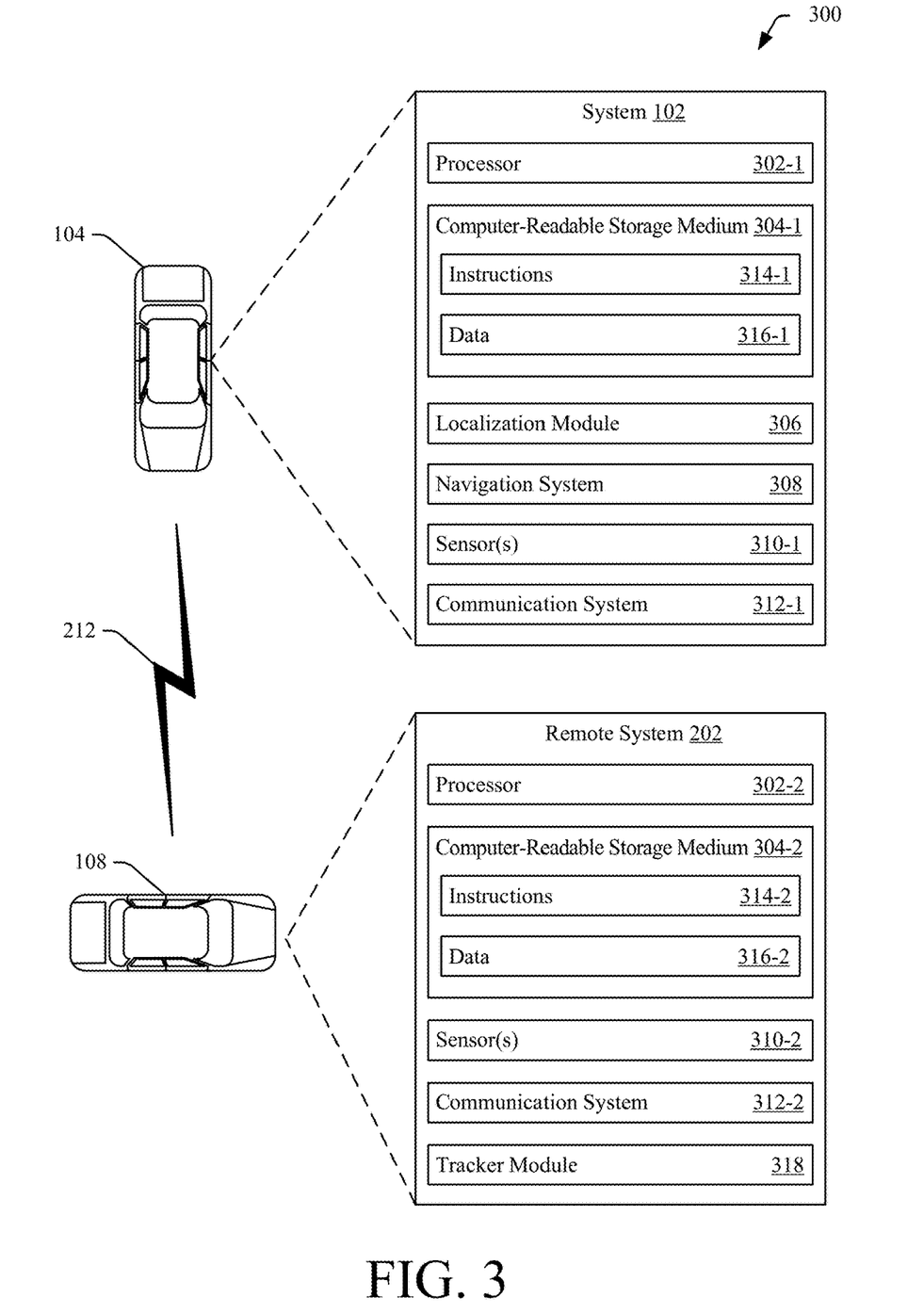
FIG. 3 is an example illustration of systems that may be used to implement vehicle localization based on pose corrections from remote vehicles in parking garages, in accordance with techniques of this disclosure.

The system 102 can also use one or more communication devices, which are described in greater detail with respect to FIG. 3, to establish a wireless link 212 with the remote vehicle 108. The wireless link 212 can be a short-range wireless link. It can be used to transmit a pose request to the remote vehicle 108 and, in response to the pose request, receive a pose correction from the remote vehicle 108. The system 102 can then use the pose correction to determine an updated pose for the host vehicle 104. In this way, the system 102 can determine an accurate and cost-effective pose.

In the environment 200, the remote vehicle 108 is parked at a charging station 204 with a charger 206 for electric vehicles. The remote vehicle 108 may or may not be charging. The remote system 202 can use sensors 208, which are described in greater detail with respect to FIG. 3, to determine a pose of the remote vehicle 108 relative to the charging station 204 and/or the charger 206. Based on the relative pose of the remote vehicle 108 and a position of the charging station 204 and/or the charger 206 in the world coordinate system, the remote system 202 can determine its position in the world coordinate system. The position of the charging station 204 and/or the charger 206 can be included in a database associated with the charging station 204, communicated to the remote system 202 via the charger 206 or other infrastructure, or otherwise provided to the remote system 202.

Upon reception of a pose request from the host vehicle 104, the remote system 202 can use the sensors 208 to determine a corrected pose of the host vehicle 104. The host vehicle 104 is located within a field-of-view 210 of the sensors 208. For example, the remote system 202 can determine a pose of the host vehicle 104 relative to the remote vehicle 108. Using the relative pose of the host vehicle 104 and the position of the remote vehicle 108, the remote system 202 can determine a corrected pose of the host vehicle 104 in the world coordinate system. The remote system 202 can then use the wireless link 212 to transmit the corrected pose to the host vehicle 104.

Example Systems

FIG. 3 is an example illustration 300 of systems that may be used to implement vehicle localization based on pose corrections from remote vehicles in parking garages, in accordance with techniques of this disclosure. The example illustration 300 comprises the system 102 of the host vehicle 104 and the remote system 202 of the remote vehicle 108. Although the host vehicle 104 and the remote vehicle 108 are illustrated as cars, the host vehicle 104 and/or the remote vehicle 108 may comprise any vehicle (e.g., a truck, a bus, a boat, a plane) without departing from the scope of this disclosure. The system 102 and the remote system 202 may be connected via the wireless link 212. One or both of the system 102 and the remote system 202 may be used to perform the techniques described herein.

As illustrated in FIG. 3, the system 102 and the remote system 202 each include at least one processor 302 (e.g., processor 302-1 and processor 302-2, respectively), at least one computer-readable storage medium 304 (e.g., computer-readable storage medium 304-1 and 304-2, respectively), at least one sensor 310 (e.g., sensor 310-1 and sensor 310-2, respectively), and communication systems 312 (e.g., communication system 312-1 and 312-2, respectively).

The sensors 310 may include cameras, radar systems, ultrasonic sensors, and/or lidar systems. The system 102 can use the sensors 310-1 to provide data to a localization module 306 and/or a navigation system 308 of the host vehicle 104. For example, the localization module 306 can use sensor data to determine an estimated pose of the host vehicle 104. The navigation system 308 can use sensor data to navigate the GNSS denial environment to a desired location (e.g., a particular parking spot). The remote system 202 can use the sensors 310-2 to localize the remote vehicle 108 relative to a charging station and/or within the GNSS denial environment. The remote system 202 can also use the sensors 310-2 to determine a corrected pose for the host vehicle 104.

The communication systems 312 facilitate the exchange of data, including a pose request, an estimated pose, a corrected pose, and/or other information (e.g., regarding the GNSS denial environment) over the wireless link 212. The communication systems 312 can, for example, include hardware, software, and/or firmware required to communicate via Wi-Fi, Dedicated Short-Range Communication, Vehicle-to-Everything (V2X), or cellular communication.

The system 102 additionally includes a localization module 306 and a navigation system 308. The localization module 306 may include a geospatial positioning system (e.g., a global positioning system (GPS), global navigation satellite system (GNSS or GLONASS) sensor), an inertial measurement system (e.g., a gyroscope or accelerometer), or other sensors (e.g., a magnetometer, software positioning engine, wheel tick sensor, lidar odometer, vision odometer, radar odometer, or other sensor odometers). The localization module 306 may provide high-accuracy location data (e.g., to within a meter) under ideal conditions or low-accuracy location data (e.g., to within a couple of meters) under non-ideal conditions (e.g., within a parking garage). For example, the localization module 306 can use dead reckoning to provide an estimated pose of the host vehicle 104 within a GNSS denial environment. The localization module 306 can determine the distance and direction traveled by the host vehicle 104 since entering the GNSS denial environment. The navigation system 308 can use pose data from the localization module 306 and/or sensor data from the sensor 310-1 to navigate the host vehicle 104 along roadways and within GNSS denial environments.

The remote system 202 additionally includes a tracker module 318. The tracker module 318 can use sensor data from one or more of the sensors 310-2 to determine a corrected pose of the host vehicle 104. For example, in response to the remote system 202 receiving a pose request from the host vehicle 104, the tracker module 318 can use radar data (or other sensor data) to determine a relative position of the host vehicle 104 to the remote vehicle 108. Using the pose of the remote vehicle 108 and the relative position of the host vehicle 104, the tracker module 318 can then determine a corrected pose of the host vehicle 104.

The processors 302 (e.g., application processors, microprocessors, digital signal processors (DSP), or controllers) are configured to execute computer-executable instructions 314 (e.g., instructions 314-1 and 314-2) stored within the computer-readable storage media 304 (e.g., non-transitory storage devices such as hard drives, solid state drives (SSD), flash memories, read-only memories (ROM), erasable programmable ROM (EPROM), or electrically erasable programmable ROM (EEPROM)) to cause the system 102 and remote system 202 to perform the techniques described herein. The instructions 314 may be part of operating systems and/or one or more applications of the system 102 and remote system 202.

The instructions 314 cause the system 102 and the remote system 202 to act upon (e.g., create, receive, modify, delete, transmit, or display) data 316 (e.g., 316-1 and 316-2). The data 316 may comprise application data, module data, sensor data, or input/output (I/O) data. The data 316 can also include a reference map for GNSS denial environments (e.g., parking garages) or the location of certain landmarks (e.g., a charging station) within GNSS denial environments. Although shown within the computer-readable storage media 304, portions of the data 316 may be within random-access memories (RAM) or caches of the system 102 and the remote system 202 (not shown). Furthermore, the instructions 314 and/or the data 316 may be remote to the system 102 and the remote system 202.

The localization module 306, the navigation system 308, or the tracker module 318 (or portions thereof) may be located within the computer-readable storage media 304 or be stand-alone components (e.g., executed in dedicated hardware in communication with the processors 302 and computer-readable storage media 304). For example, the instructions 314 may cause the processors 302 to implement or otherwise cause the system 102 or the remote system 202 to implement the techniques described herein.

Vehicle Localization Process

Figure 4:
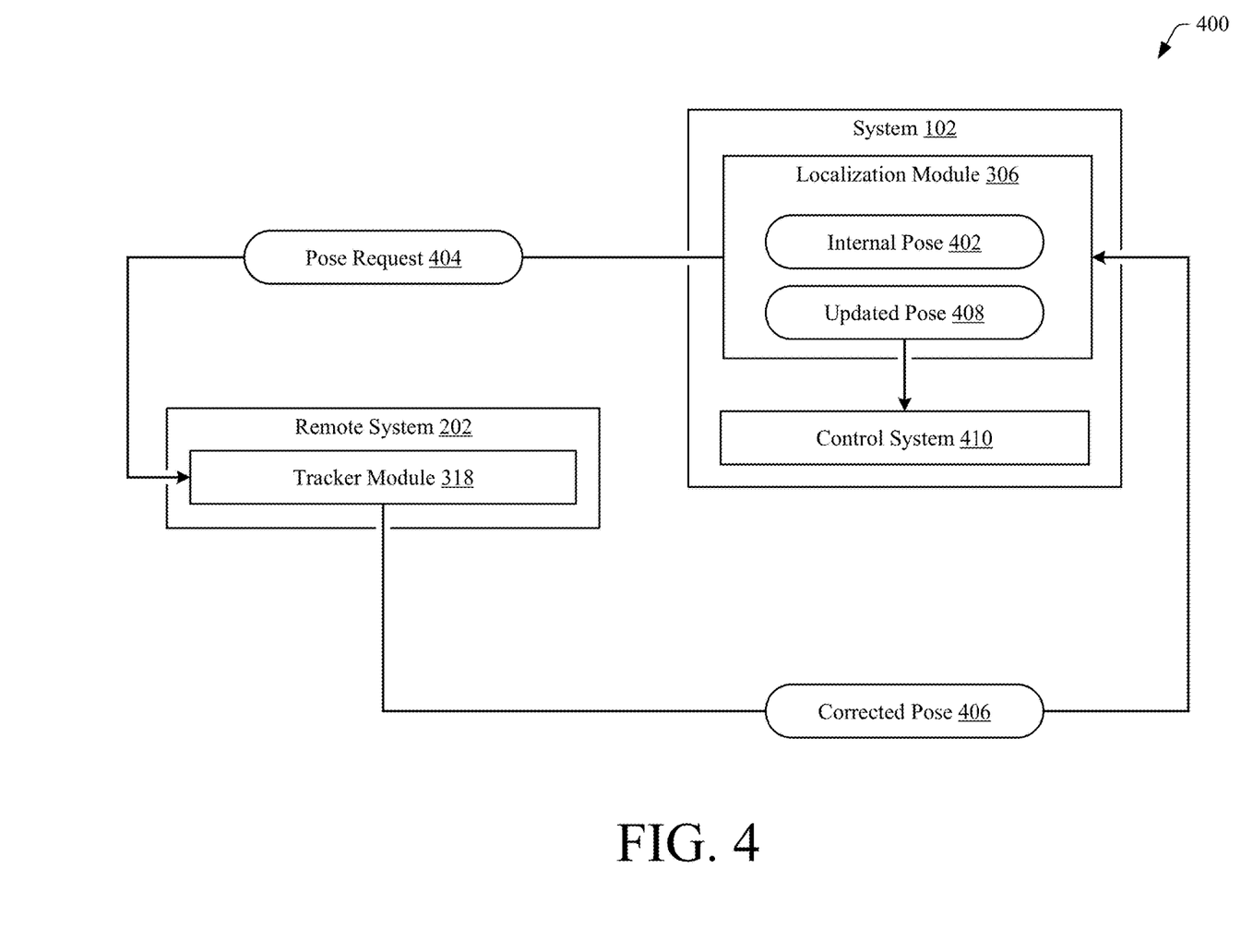
FIG. 4 is an example conceptual diagram of a process to localize a host vehicle based on pose corrections from a remote vehicle in a parking garage, in accordance with techniques of this disclosure.

FIG. 4 is an example conceptual diagram 400 of a process to localize a host vehicle (e.g., the host vehicle 104) based on pose corrections from a remote vehicle (e.g., the remote vehicle 108) in a parking garage. Conceptual diagram 400 may be performed by the system 102 of the host vehicle 104. Conceptual diagram 400 may include additional or fewer operations or be performed in a different order.

As the host vehicle 104 autonomously navigates a parking garage or other GNSS denial environment, the localization module 306 of the system 102 can estimate an internal pose 402 of the host vehicle 104. The internal pose 402 can be in a world coordinate system (or a map coordinate system). The localization module 306 can use the sensors 310-1 to determine the internal pose 402. For example, the localization module 306 can use odometry sensors and/or inertial measurement units to determine the distance and heading traveled by the host vehicle 104 upon entry into the parking garage. Such odometry sensors and inertial measurement units, however, are subject to drift and the internal pose 402 may not be sufficiently accurate for autonomous navigation in the parking garage.

To improve the accuracy of the internal pose 402, the system 102 and/or the localization module 306 can transmit a pose request 404 to the remote system 202 of the remote vehicle 108. The pose request 404 includes a query for the remote system 202 to provide the position of the host vehicle 104 as determined by the tracker module 318 of the remote system 202. The system 102 and/or the localization module 306 can also transmit the internal pose 402 along with or separate from the pose request 404.

The tracker module 318 can use data from the sensors 310-2 to determine a corrected pose 406 of the host vehicle 104. For example, the tracker module 318 can use radar data, ultrasonic data, camera data, and/or lidar data to determine the position of the host vehicle 104 relative to the remote vehicle 108. In the described implementation, the remote vehicle 108 is parked at a charging station within the parking garage. The remote system 202 can obtain the location of the charging station in the world coordinate system via a QR code located in or near the charging station, wireless communication (e.g., V2X communication) with infrastructure in the parking garage, or a map database. The tracker module 318 can use sensor data to determine the pose of the remote vehicle 108 relative to the charging station, which can be used to determine the pose of the remote vehicle 108 in the world coordinate system. Using the pose of the remote vehicle 108 and the relative pose of the host vehicle 104, the tracker module 318 can determine the corrected pose 406 of the host vehicle 104. The remote system 202 and/or the tracker module 318 can transmit the corrected pose 406 to the system 102 and/or the localization module 306 of the host vehicle 104.

The localization module 306 can use the corrected pose 406 to determine an updated pose 408 of the host vehicle 104. Similar to the internal pose 402, the updated pose 408 is in the world coordinate system. If the localization module 306 receives multiple corrected poses 406 from one or more remote vehicles 108, the localization module 306 can average the corrected poses 406 to determine the updated pose 408. The localization module 306 and/or the system 102 then provides the updated pose 408 to a control system 410 of the host vehicle 104. The control system 410 uses the updated pose 408 to continue autonomous navigation of the host vehicle 104 within the parking garage.

Example Methods

Figure 5:
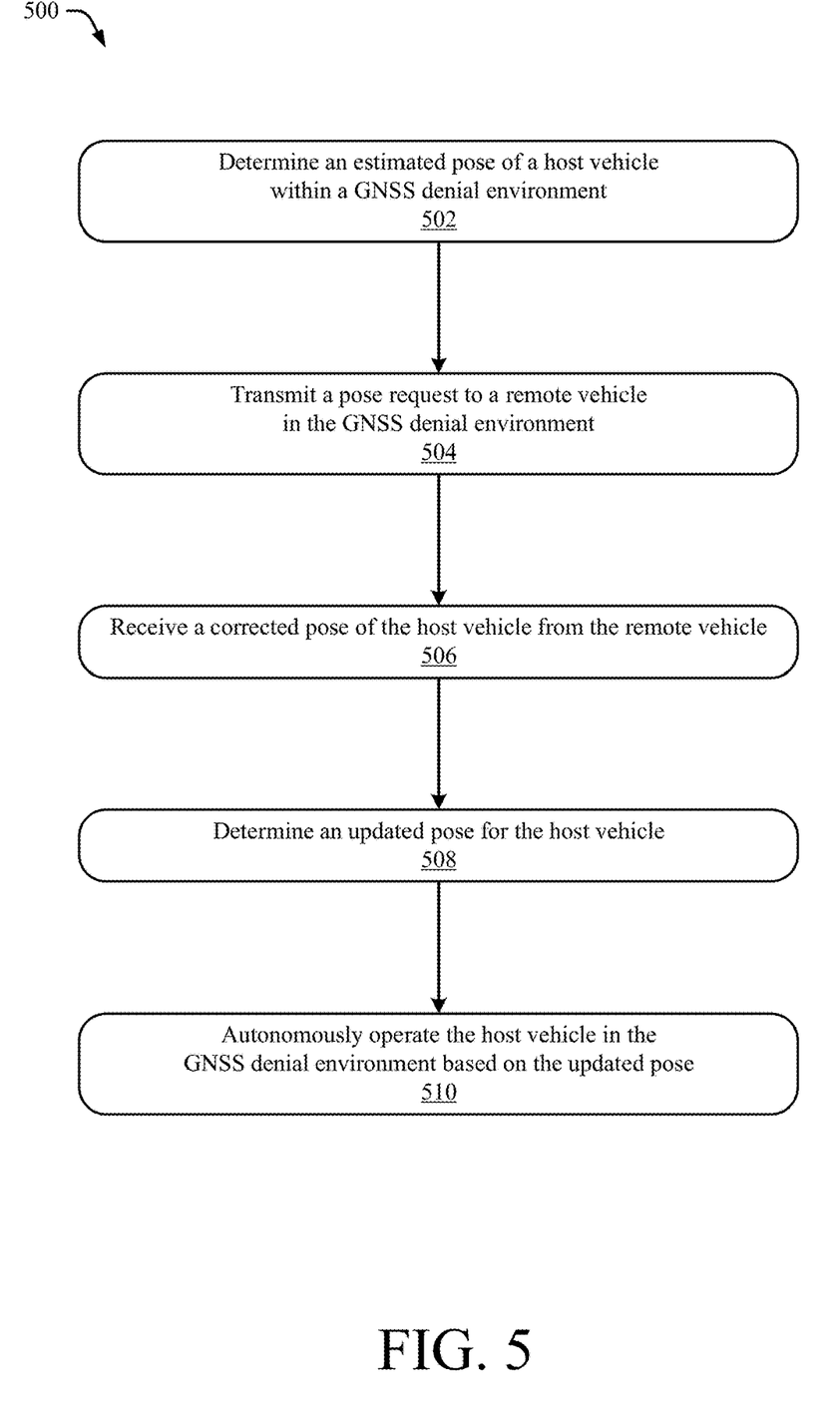
FIG. 5 illustrates an example method for vehicle localization based on pose corrections from remote vehicles in a parking garage.

FIG. 5 illustrates an example method 500 for vehicle localization based on pose corrections from remote vehicles in a parking garage. Method 500 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 4, reference to which is made for example only. The techniques are not limited to performance by one entity or multiple entities. For example, the system can be the system 102 of FIGS. 1 and 2.

At 502, a host vehicle determines an estimated pose of the host vehicle within a GNSS denial environment. For example, the system 102 or the localization module 306 can determine an internal pose 402 of the host vehicle 104 in a GNSS denial environment (e.g., a parking structure or garage). The internal pose 402 can be in a map or world coordinate system.

The localization module 306 can determine the internal pose 402 of the host vehicle 104 within the GNSS denial environment by obtaining, in the map or world coordinate system, an initial pose of the host vehicle 104 upon entry into the GNSS denial environment. The localization module 306 can then determine a heading and a distance traveled by the host vehicle 104 after entering the GNSS denial environment. The heading and distance traveled can be determined using inertial measurement units, cameras, radar systems, or other sensors. The localization module 306 can combine the initial pose and the distance and heading traveled to estimate the internal pose 402.

At 504, a pose request is transmitted to a remote vehicle in the GNSS denial environment. For example, the system 102 or the localization module 306 can transmit the pose request 404 to the remote vehicle 108 or the remote system 202. The internal pose 402 can also be sent to the remote vehicle 108. The remote vehicle 108 can be parked at an electric-vehicle charging station in the GNSS denial environment. The system 102 or the localization module 306 can transmit the pose request 404 and/or the internal pose 402 using a wireless link using Wi-Fi, Dedicated Short-Range Communication, Vehicle-to-Everything (V2X) communication, or cellular communication.

At 506, a corrected pose of the host vehicle is received from the remote vehicle. For example, the system 102 or the localization module 306 can receive the corrected pose 406 from the remote system 202 or the tracker module 318 of the remote vehicle 108. If the system 102 sends the internal pose 402 to the remote system 202, the corrected pose 406 may provide correction values to the internal pose 402 from which the system 102 can determine the corrected pose 406.

At 508, an updated pose for the host vehicle is determined using the corrected pose. For example, the system 102 or the localization module 306 can determine the updated pose 408 using the corrected pose 406 received from the remote system 202. In other implementations, the system 102 can transmit a pose request to the remote system 202 querying for the pose of the remote vehicle 108. Based on an internal pose of the remote vehicle 108 received in response to the pose request and the relative pose of the remote vehicle 108 to the host vehicle 104, the system 102 can determine an updated or corrected pose for the host vehicle 104.

At 510, the host vehicle is autonomously operated based on the updated pose. For example, the system 102 or the localization module 306 can provide the updated pose 408 to the control system 410. The control system 410 can use the updated pose 408 to autonomously operate the host vehicle 104 in the GNSS denial environment.

Figure 6:
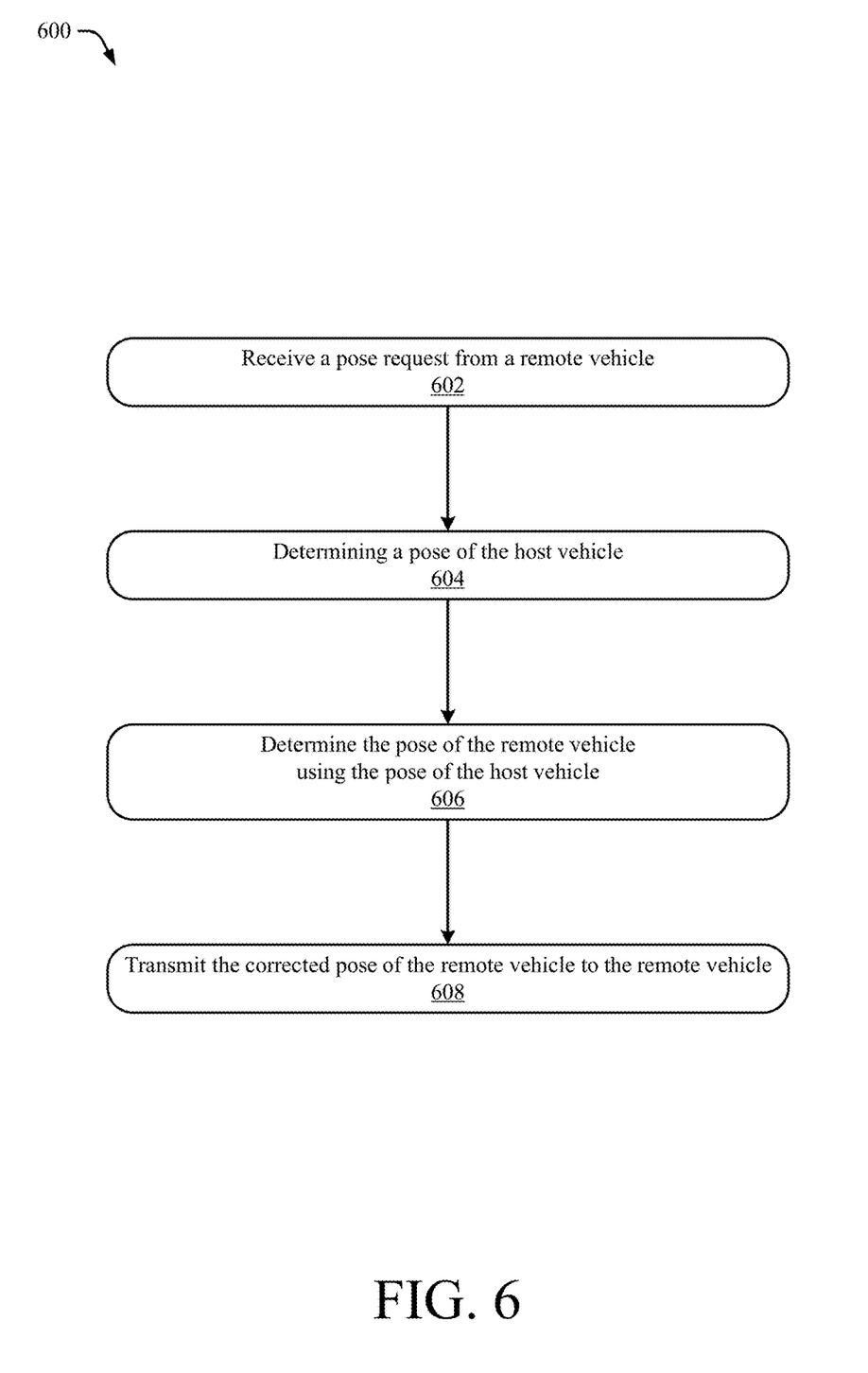
FIG. 6 illustrates an example method for a remote vehicle in a parking garage to provide pose corrections to an autonomous vehicle.

FIG. 6 illustrates an example method 600 for a remote vehicle in a parking garage to provide pose corrections to an autonomous vehicle. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 4, reference to which is made for example only. The techniques are not limited to performance by one entity or multiple entities. For example, the system can be the remote system 202 of FIGS. 2 through 4.

At 602, a pose request is received by a host vehicle from a remote vehicle. For example, the remote vehicle 108 (referred to as the host vehicle in FIG. 6) or the remote system 202 can receive the pose request 404 from the system 102 or the localization module 306 of the host vehicle 104 (referred to as the host vehicle in FIG. 6). The remote vehicle 108 is parked at an electric-vehicle charging station in the GNSS denial environment (e.g., a parking structure or garage). The host vehicle 104 is being autonomously operated in a GNSS denial environment.

At 604, a pose of the host vehicle is determined. For example, the remote vehicle 108 can determine its pose in the GNSS denial environment. The remote vehicle 108 can obtain a location of a portion of the electric-vehicle charging station (e.g., a charger, an image, or any other landmark) in a map or world coordinate system. The remote vehicle 108 can also determine its pose relative to the portion of the electric-vehicle charging station. The relative pose of the remote vehicle 108 can be determined using a camera, ultrasonic sensors, and/or radar sensors. The pose of the remote vehicle 108 can then be determined using the location of the portion of the electric-vehicle charging station and its relative pose in the map or world coordinate system.

At 606, a corrected pose of the remote vehicle is determined. For example, the remote system 202 determines the corrected pose 406 of the host vehicle 104. The remote system 202 can use the tracker module 318 to determine the corrected pose 406.

At 608, the corrected pose of the remote vehicle is transmitted to the remote vehicle. For example, the remote system 202 can transmit the corrected pose 406 to the host vehicle 104. The driver or owner of the remote vehicle 108 can receive a financial incentive for being ready to provide or providing the corrected pose 406 for one or more autonomous vehicles in the GNSS denial environment. For example, the financial incentive can include a reduced charging rate, a reduced parking fee, a preferred parking space, or a charging credit.

EXAMPLES

Example 1. A method comprising: determining, by a host vehicle, an estimated pose of the host vehicle within a GNSS denial environment; transmitting, by the host vehicle, a pose request to a remote vehicle in the GNSS denial environment; receiving, from the remote vehicle, a corrected pose of the host vehicle; determining, by the host vehicle and using the corrected pose, an updated pose for the host vehicle; and autonomously operating the host vehicle in the GNSS denial environment based on the updated pose.

Example 2. The method of example 1, wherein the remote vehicle is parked at an electric-vehicle charging station in the GNSS denial environment.

Example 3. The method of any one of the preceding examples, wherein the estimated pose and the updated pose are in a map coordinate system.

Example 4. The method of any one of the preceding examples, wherein determining the estimated pose of the host vehicle within the GNSS denial environment comprises: obtaining, in a map coordinate system, an initial pose of the host vehicle upon entry into the GNSS denial environment; and determining a heading and a distance traveled by the host vehicle after entering the GNSS denial environment.

Example 5. The method of example 4, wherein the heading and the distance are determined using at least one of one or more inertial measurement units, cameras, or radar systems.

Example 6. The method of any one of the preceding examples, wherein the pose request is transmitted using a wireless link that uses at least one of Dedicated Short-Range Communication, Vehicle-to-Everything (V2X), or cellular communication.

Example 7. The method of any one of the preceding examples, the method further comprising: transmitting, by the host vehicle, the estimated pose of the host vehicle to the remote vehicle, wherein the corrected pose provides correction values to the estimated pose.

Example 8. A system comprising one or more processors configured to perform the method of any one of the preceding examples.

Example 9. A non-transitory computer-readable medium that stores computer-executable instructions that, when executed by a processor, cause the processor to perform the method of any one of examples 1 through 7.

Example 10. A method comprising: receiving, by a host vehicle, a pose request from a remote vehicle, the remote vehicle being autonomously operated in a GNSS denial environment, the pose request requesting a pose of the remote vehicle; determining, by the host vehicle, the pose of the remote vehicle; and transmitting, by the host vehicle and to the remote vehicle, the pose of the remote vehicle.

Example 11. The method of example 10, wherein the host vehicle is parked at an electric-vehicle charging station in the GNSS denial environment.

Example 12. The method of example 11, the method further comprising: obtaining, by the host vehicle, a location of a portion of the electric-vehicle charging station in a map coordinate system; determining, by the host vehicle, a relative pose of the host vehicle relative to the portion of the electric-vehicle charging station; and determining, using the location of the portion of the electric-vehicle charging station and the relative pose of the host vehicle, a pose of the host vehicle in the map coordinate system to determine the pose of the remote vehicle.

Example 13. The method of example 12, wherein the relative pose of the host vehicle is determined using at least one of a camera, ultrasonic sensor, or radar sensor.

Example 14. The method of any one of examples 10 through 13, wherein the host vehicle uses a tracker module to determine the pose of the remote vehicle.

Example 15. The method of any one of examples 10 through 14, the method further comprising: receiving a financial incentive to provide the pose for the remote vehicle.

Example 16. The method of example 15, wherein the financial incentive comprises at least one of a reduced charging rate, a reduced parking fee, a preferred parking space, or a charging credit.

Example 17. A system comprising one or more processors configured to perform the method of any one of examples 10 through 16.

Example 18. A non-transitory computer-readable medium that stores computer-executable instructions that, when executed by a processor, cause the processor to perform the method of any one of examples 10 through 16.

CONCLUSION

Although implementations of vehicle localization based on pose corrections from remote vehicles in parking garages and other GNSS denial environments have been described in language specific to certain features and/or methods, the subject of the appended claims is not necessarily limited to the specific features or methods described. Rather, the specific features and methods are disclosed as example implementations for vehicle localization based on pose corrections from remote vehicles in parking garages. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
   determining, by a host vehicle, an estimated pose of the host vehicle within a GNSS denial environment;
   transmitting, by the host vehicle, a pose request to a remote vehicle in the GNSS denial environment;
   receiving, from the remote vehicle, a corrected pose of the host vehicle;
   determining, by the host vehicle and using the corrected pose, an updated pose for the host vehicle; and
   autonomously operating the host vehicle in the GNSS denial environment based on the updated pose.

2. The method of claim 1, wherein the remote vehicle is parked at an electric-vehicle charging station in the GNSS denial environment.

3. The method of claim 1, wherein the estimated pose and the updated pose are in a map coordinate system.

4. The method of claim 1, wherein determining the estimated pose of the host vehicle within the GNSS denial environment comprises:
   obtaining, in a map coordinate system, an initial pose of the host vehicle upon entry into the GNSS denial environment; and
   determining a heading and a distance traveled by the host vehicle after entering the GNSS denial environment.

5. The method of claim 4, wherein the heading and the distance are determined using at least one of one or more inertial measurement units, cameras, or radar systems.

6. The method of claim 1, wherein the pose request is transmitted using a wireless link that uses at least one of Dedicated Short-Range Communication, Vehicle-to-Everything (V2X), or cellular communication.

7. The method of claim 1, the method further comprising transmitting, by the host vehicle, the estimated pose of the host vehicle to the remote vehicle, wherein the corrected pose provides correction values to the estimated pose.

8. The method of claim 1, wherein the GNSS denial environment is a parking structure.

9. A method comprising:
receiving, by a host vehicle, a pose request from a remote vehicle, the remote vehicle being autonomously operated in a GNSS denial environment, the pose request requesting a pose of the remote vehicle;
obtaining, by the host vehicle, a location of a portion of an electric-vehicle charging station in a map coordinate system;
determining, by the host vehicle, a relative pose of the host vehicle relative to the portion of the electric-vehicle charging station;
determining, using the location of the portion of the electric-vehicle charging station and the relative pose of the host vehicle, a pose of the host vehicle in the map coordinate system;
determining, by the host vehicle, the pose of the remote vehicle based on the pose of the host vehicle in the map coordinate system; and
transmitting, by the host vehicle and to the remote vehicle, the pose of the remote vehicle.

10. The method of claim 9, wherein the host vehicle is parked at the electric-vehicle charging station in the GNSS denial environment.

11. The method of claim 9, wherein the relative pose of the host vehicle is determined using at least one of a camera, ultrasonic sensor, or radar sensor.

12. The method of claim 9, wherein the host vehicle uses a tracker module to determine the pose of the remote vehicle.

13. The method of claim 9, the method further comprising receiving a financial incentive to provide the pose for the remote vehicle.

14. The method of claim 13, wherein the financial incentive comprises at least one of a reduced charging rate, a reduced parking fee, a preferred parking space, or a charging credit.

15. The method of claim 9, further comprising transmitting, by a processor of the host vehicle and via a communication system, the pose of the remote vehicle to the remote vehicle to enable autonomous control of the remote vehicle based on the pose of the remote vehicle.

16. The method of claim 9, further comprising determining, by a processor of the host vehicle, the pose of the remote vehicle based on an output from at least one sensor of the host vehicle, which is configured to detect the remote vehicle.

17. The method of claim 9, further comprising:
receiving a financial incentive to, in response to the pose request, provide the pose of the remote vehicle;
indicating the financial incentive to an occupant of the host vehicle;
receiving a response from the occupant approving determination of the pose of the remote vehicle; and
determining the pose of the remote vehicle in response to receiving the response from the occupant.

18. A system comprising one or more processors configured to:
determine an estimated pose of a host vehicle within a GNSS denial environment;
transmit a pose request to a remote vehicle in the GNSS denial environment;
receive, from the remote vehicle, a corrected pose of the host vehicle;
determine, using the corrected pose, an updated pose for the host vehicle; and
autonomously operate the host vehicle in the GNSS denial environment based on the updated pose.

19. The system of claim 18, wherein the remote vehicle is parked at an electric-vehicle charging station in the GNSS denial environment.

20. The system of claim 18, wherein the one or more processors are configured to determine the estimated pose of the host vehicle within the GNSS denial environment by:
obtaining, in a map coordinate system, an initial pose of the host vehicle upon entry into the GNSS denial environment; and
determining a heading and a distance traveled by the host vehicle after entering the GNSS denial environment.

21. The system of claim 18, wherein the pose request is transmitted using a wireless link that uses at least one of Dedicated Short-Range Communication, Vehicle-to-Everything (V2X), or cellular communication.

22. The system of claim 18, wherein the GNSS denial environment is a parking structure.

* * * * *